Patented Aug. 18, 1953

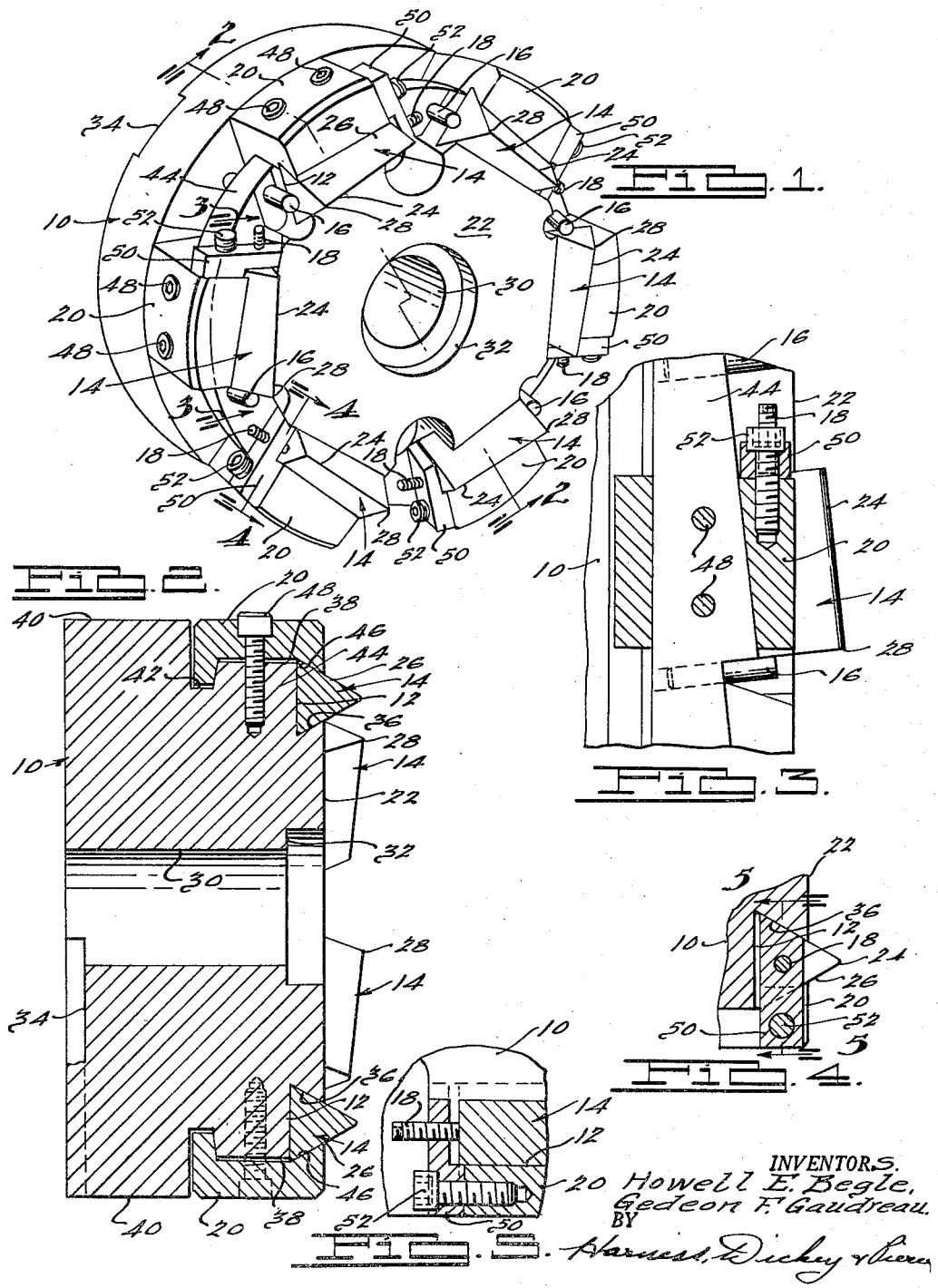

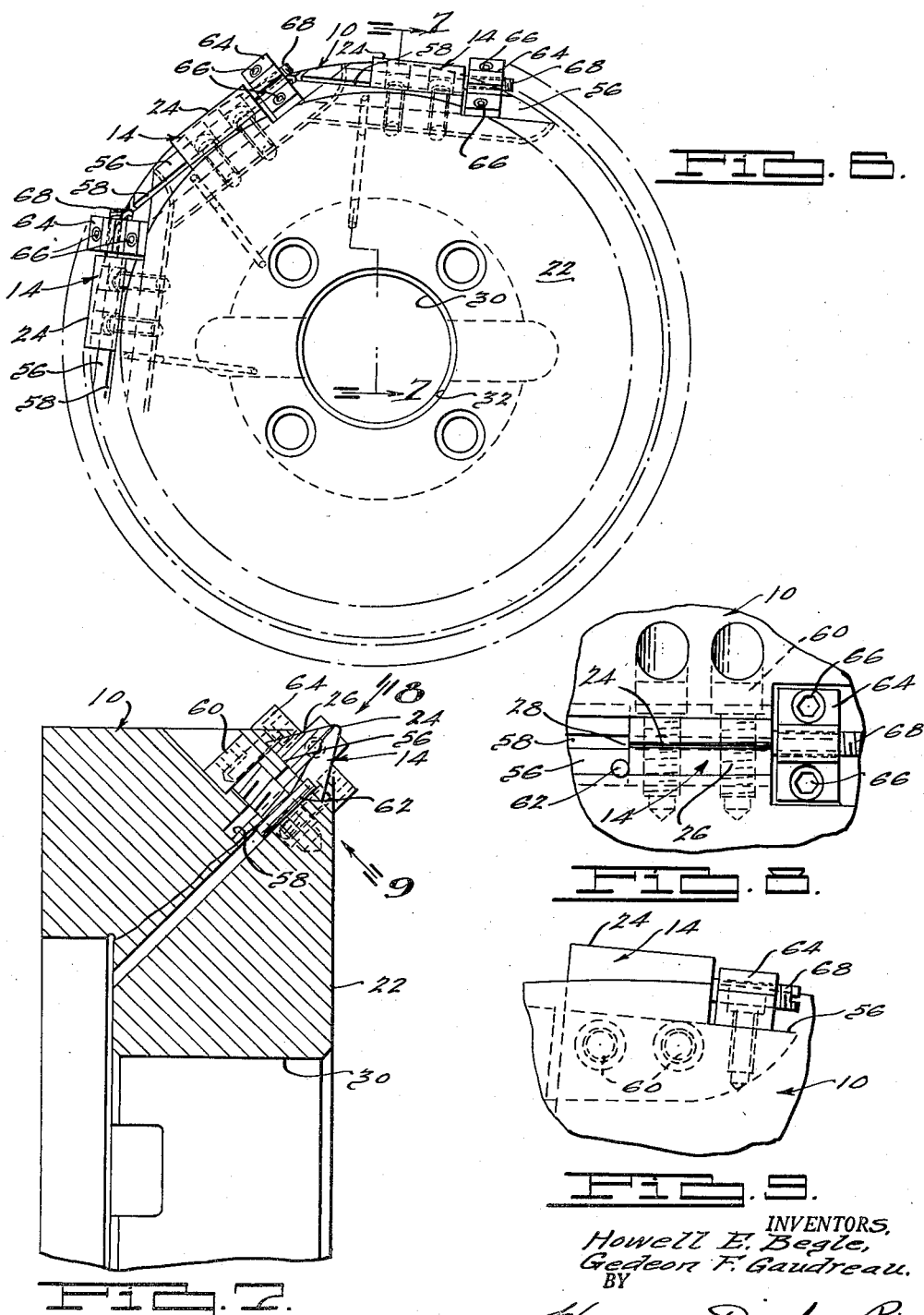

2,648,893

UNITED STATES PATENT OFFICE 2,648,893

ROTARY CUTTER

Howell E. Begle and Gedeon F. Gaudreau, Detroit, Mich.; said Gaudreau assignor to said Begle Application April 1, 1948, Serial No. 18,414

7 Claims. (Cl. 29—105)

This invention relates to new and useful improvements in milling cutters.

At the present time it is conventional practice in milling operation to employ a number of individual cutting elements, such as solid tungsten carbide blades or carbide tipped blades, which are uniformly spaced around the circumference of a cutter body or head and held on axes perpendicular or tangent to the periphery of the head by serrations or other clamping means. By these practices it is necessary that uniform cutting angles and clearance angles be ground by abrasive wheels on each individual cutting element or blade prior to use. Further, since it is necessary that all cutting elements be positioned within close tolerances to a plane disposed parallel with respect to the radial outer face of the head in order that the milling stress fall equally upon each cutting element, it is conventional practice to grind cutting and clearance angles on the individual cutting elements after they have been mounted or positioned in the cutter body. In practice, the cutting elements are assembled on the cutting head, the latter is then mounted on a cutter grinding machine, and each individual cutting element is ground to size and gauged. On large cutters having a multitude of blades it is often difficult to get all of the cutting elements on the same plane inasmuch as the abrasive wheel wears considerably before all blades in the entire circumference can be ground equally.

Of more importance, the regrinding of the conventional cutter after the cutting elements have become dulled or broken by use, is time-consuming and costly. Each inserted blade has only one cutting edge, and when in need of resharpening it is mandatory to remove the entire cutter head from the milling machine with consequent interruption of production. The entire cutting head is then routed to the tool room where it is set up and ground in the manner described above.

According to another conventional procedure the individual cutting elements are identically ground to a template and are then set loosely in the cutter head. The latter is then placed on a surface plate having a carefully lapped, level surface; and, when the blades or cutting elements are thus on the same plane, they are tightened in the head. By this procedure the cutter head must still be removed from the milling machine however, and adjusting the cutter elements is tedious and time-consuming.

An important object of the present invention is to provide a milling cutter in which the individual cutting elements can be easily, quickly and accurately adjusted or substituted in the cutter head while the latter is in milling position in the milling machine.

Another object of the invention is to position the cutting elements in the cutter head so that in operation they exert a lateral and much stronger milling force which allows faster milling speeds and greater feeds and cuts and imparts longer life to the individual cutting elements.

Still another object of the invention is to provide a novel arrangement of the cutting elements on the cutting head permitting the use of solid tungsten carbide cutting elements which are of triangular, round, square, or prismatical shape in transverse section, which elements in their natural form provide usable cutting or clearance angles so as to obviate the necessity of initial grinding and subsequent regrinding of such angles on each individual cutting element.

Other objects and advantages of the invention will be apparent during the course of the following description.

In the drawings forming a part of this specification and wherein like numerals are employed to designate like parts throughout the same:

Fig. 1 is a perspective view showing a milling cutter embodying the invention;

Fig. 2 is a diametrical, longitudinal sectional view taken on the line 2—2 of Fig. 1;

Fig. 3 is a fragmentary, longitudinal sectional view taken on the line 3—3 of Fig. 1;

Fig. 4 is a fragmentary, diametrical, longitudinal sectional view taken on the line 4—4 of Fig. 1;

Fig. 5 is a fragmentary, transverse sectional view taken on the line 5—5 of Fig. 4;

Fig. 6 is a front elevational view showing a modified form of the invention;

Fig. 7 is a fragmentary, enlarged, diametrical, longitudinal sectional view taken on the line 7—7 of Fig. 6;

Fig. 8 is a fragmentary view looking in the direction of the arrow 8 in Fig. 7; and Fig. 9 is a fragmentary view looking in the direction of the arrow 9 in Fig. 7.

Considered in certain of its broader aspects the milling cutter shown in Figs. 1–5 comprises a rotatable cutter head 10 having a plurality of dovetail grooves 12 extending along chords around the periphery thereof. Each groove 12 contains a longitudinally adjustable carbide steel cutting element 14 having the shape of an equilateral triangle in transverse section. Longitudinal adjustment of each cutting element 14 in one direction is limited by a stop member 16, and the cutting elements are held solidly against the stop members by back-up screws 18. Clamping blocks 20 which define part of the dovetail grooves 12 hold the cutting elements 14 clamped solidly against and fixed to the cutter head 10.

All of the cutting elements 14 are identical in cross-sectional size and shape, and all of the dovetail grooves 12 are identically positioned with respect to the radial outer face 22 of the cutter head 10. Thus, since the cutting elements 14 are mounted with one side thereof against the bottom surfaces of the dovetail grooves 12, all the cutting elements will project equidistantly from the cutter head 10. In practice, the bottom surfaces of the dovetail grooves 12 incline slightly rearwardly from the stop members 16 to provide clearance along the forward edges 24 of cutting elements 14, and the ends of the cutting elements remote from stop member 16 are disposed slightly closer to the axis of the cutter head 10 to provide clearance along the outer sides 26 of the cutting elements.

The cutter head 10 rotates in the direction of the arrow in Fig. 1 so that the ends of the cutting elements 14 which engage stop members 16 constitute the leading ends of the cutting elements, and the ends remote from the stop member 16 constitute the trailing ends thereof. The outer forward corners 28 of the cutting elements 14 constitute the cutting parts which engage and act on the work (not shown). Since the cutting elements 14 are identical and since they are identically positioned and located on the cutter head 10 by the dovetail grooves 12 and the stop members 16, all the cutting parts 28 necessarily lie precisely in a plane parallel to the outer face 22 of the cutter head.

Only one corner, viz., the corner 28, of each cutting element 14 is used at a time. However, by reason of the unique shape of the cutting elements 14 and by reason of the particular manner in which they are mounted on the cutter head 10, each cutting element may be placed in its respective dovetail groove 12 in any one of three positions. By rotating the cutting elements 14 as required, all three corners at the leading ends thereof can be exposed for cutting; and, by changing the cutting elements 14 end for end and turning them in the manner described, all six corners can be used before sharpening is necessary. Thus the particular shape of the cutting elements 14 and the manner in which they are mounted in the cutter head 10 greatly extends the cutting life of the tool.

After all six corners of the cutting elements 14 have become worn and dull, they are removed from the cutter head 10 and replaced by new or previously ground and sharpened cutting elements. In practice, the cutting elements 14 can be easily and quickly removed from the cutter head 10 merely by loosening the clamping blocks 20. The replacement cutting elements are then inserted in place of those previously removed and the clamping blocks 20 are again tightened. If the replacement cutting elements 14 are of different length, the back-up screws 18 are adjusted until the cutting elements fit snugly between the inner end of the screws and the stop members 16. Manifestly, it is important in every instance that the cutting elements 14 be held solidly against the stop members 16 by back-up screws 18 in order to assure uniform positioning of the cutting points 28.

Worn or dull cutting elements 14 can be easily sharpened for re-use merely by grinding the two ends until the corners are again sharp. In practice, the cutting elements 14 may be used until they become so short that they are no longer capable of withstanding the stresses to which they are subjected in use. However, it will be readily apparent that the particular length of the cutting elements 14 in no way affects the position of the cutting points 28 on the cutter head 10 and that six points are still available for use even though the cutting elements may be considerably shorter than shown in the drawings. It is not essential that all of the cutting elements 14 be of the same length, since the back-up screws 18 are individually adjustable and can be set according to the exigencies of the particular situation. The cutting elements 14 are interchangeable on the cutter head 10, and it is not necessary that any particular cutting element be located in any particular position on the head. It is an important feature of the invention that the individual cutting elements can be repositioned or replaced in the head without removing the latter from the machine.

More specifically, the cutter head 10 here shown is generally disk-shaped and is formed with the usual axial bore 30 which is adapted to fit a standard spindle. The usual countersink 32 is provided at the forward end of bore 30 in face 22. A radial key- or guideway 34 is provided in the rear face of the cutter head which interlocks with the spindle in the conventional manner to establish a rotary drive therebetween.

Around the periphery of the radial outer face 22 is an annular recess which defines the bottom and one side of the dovetail grooves 12. The side portions of the recess adapted to receive the cutting elements 14 are flat and undercut as at 36. If triangular cutting elements of the type here shown are employed, the included angle between the bottom of the recess and the undercut side portions 36 is sixty degrees, so that the undercut sides overlap with and flatly engage the inner sides of the cutting elements 14. Also, the bottom surface of the annular recess is approximately as wide as the sides of the cutting elements 14 so that the outer base edges of the latter extend along and are essentially flush with the periphery of the cutter head 10.

It will be observed (Fig. 2) that the forward peripheral portion 38 of the cutter head 10 immediately behind or below the annular recess referred to above is radially inwardly offset from the adjacent rearward peripheral portion 40 to accommodate the clamping blocks 20, and a radial annular groove 42 is provided at the juncture of the two peripheral portions 38 and 40. Thus, the above construction provides an annular flange 44 adjacent the forward face of the cutter head 10, which flange forms a supporting ledge for the cutting elements 14 and a retaining means for the clamping blocks 20.

The clamping blocks 20 are generally U-shaped in transverse section, as perhaps best shown in Fig. 2, and the blocks are positioned in embracing relation to the flange 44 at the outer sides of the cutting elements 14. The upper or outer flange of each clamping block 20 is provided with a tapered surface 46 which overlies and flatly engages the outer side of its respective cutting element 14. The lower or rearward flange of each clamping block 20 fits within the annular groove 42. Preferably the inner face of the lower flange is provided with a slight taper, and the confronting face of flange 44 is correspondingly tapered, as shown in Fig. 2. Two Allen-head screws 48 extend radially through each clamping block 20 and are threaded into the cutter head 10, and the heads of the screws 48 preferably are countersunk in the block as shown in the drawing. When the screws 48 are tightened, the tapered surfaces 46 are pulled solidly against the cutting elements 14 and in turn press the cutting elements solidly against the inclined inner surfaces 36. Thus the two surfaces 36 and 46 at opposite sides of the cutting elements 14 define opposite sides of the dovetail groove 12, and the clamping blocks 20 serve to hold the cutting elements 14 stationary or fixed in the dovetail grooves.

The stop members 16 here shown merely comprise pins which are embedded in the flange 44 at spaced points therearound. These pins 16 engage the forward or leading ends of cutting elements 14, and they position the cutting elements circumferentially on the head. Since the bottom surfaces of the dovetail grooves 12 are inclined slightly with respect to the outer or forward cutter face 22, adjustment of the cutting elements 14 longitudinally in the grooves advances or retracts the cutting points 28. As the cutting elements are moved longitudinally in the dovetail groove 12 toward the pins 16, the cutting points 28 are advanced, and as the cutting elements are moved longitudinally in the dovetail grooves away from the pins 16, the cutting points 28 are retracted. By properly locating the pins 16 on the cutter head, all of the cutting points 28 will be postioned exactly in a plane parallel to the face 22 when the cutting elements are disposed with the leading ends thereof against the pins. Thus the pins 16 not only locate the cutting elements 14 circumferentially on the cutter head 10 but they also control the distance the cutting point 28 is projected beyond the forward face 22 of the head. It will be readily apparent that if all the pins 16 are identically positioned relative to their respective dovetail grooves 12, they will automatically position the various cutting elements 14 in precisely the same position on the cutter head. As clearly shown in the drawings, the pins 16 terminate a substantial distance below the cutting points 28 so as not to interfere in any way with the operation of the tool.

The back-up screws 18 are carried by supports 50 which are fastened to the rearward or trailing ends of the clamping blocks 20. In the form of the invention here shown the supports 50 are fastened to the clamping blocks 20 by Allen-head screws 52 and the supports project laterally from the clamping blocks across the trailing ends of the adjacent cutting elements 14. When the cutting elements 14 are full length, they fit relatively snugly between the stop members 16 and the supports 50. Thus, when relatively new cutting elements are used the back-up screws 18 are substantially fully retracted. However, as the cutting elements 14 are worn shorter in use, the back-up screws 18 are advanced to compensate for such wear. The primary function of back-up screws 18 is to hold the cutting elements 14 against the stop members 16 before the clamping blocks 20 are tightened. Very little, if any, strain is imposed rearwardly against the back-up screws 18 when the tool is in operation, since the cutting elements 14 are held solidly against rearward movement by the clamping blocks 20.

While the cutting elements 14 here shown are generally triangular in transverse section, it is contemplated that cutting elements having any desired polygonal shape may be employed. Any shape which will provide the necessary cutting corners 28 and which permits the cutting elements to be turned on the cutter head to bring the various cutting points at each end thereof into operative position on the head is within the scope of the present invention.

The form of the invention shown in Figs. 6–9 is generally similar to the form shown in Figs. 1–5, but the cutting elements 14 are mounted in and fastened to the cutter head 10 in a slightly different manner. If the cutting elements 14 are set radially inwardly from the periphery of the cutter head 10, as shown in Figs. 1–5, the cutter cannot be used to finish a portion of the work next to a flange or the like. However, in the latter form of the invention (Figs. 6–9) the cutting elements 14 are mounted to project not only beyond the radial outer face 22 but also beyond the periphery of the cutter head 10. When the cutting elements 14 are mounted in this manner there are no obstructing parts which prevent the cutting elements from working immediately adjacent a flange or the like on the work.

The head 10 here shown is equipped with eight cutting elements 14, and the cutting elements are mounted in dovetail grooves 56 which are cut into the forward peripheral edge of the head with the bottom surfaces thereof disposed substantially at forty-five degrees with respect to the axis of the head (Fig. 7). In general, one cutting element 14 is provided for each inch in diameter of the cutter head 10, so that the number of blades on any particular head will depend considerably upon the size of the latter. It is to be understood, however, that the above is a general rule only and that it can be varied if necessary or desirable.

When eight cutting elements 14 are provided on a head of the size shown in the drawings, the adjacent dovetail grooves 56 intersect as shown in Fig. 6. Collectively, the dovetail grooves 56 define a generally octagonal figure around the cutter head 10. Each dovetail groove 56 is provided with a longitudinal slot 58, which slot extends longitudinally thereof and downwardly into the head 10. Both ends of the slots 58 extend through the periphery of the head 10 so that the portions of the head at opposite sides of the slots can be flexed relative to each other. Allen-head clamping screws 60 are threaded into the head 10 across the slots 58, and these screws can be tightened to draw the sides of dovetail grooves 56 solidly against the cutting elements 14. Preferably the screws 60 are countersunk, as shown in Fig. 7, so that no part thereof projects beyond the periphery of the cutter head 10. All of the dovetail grooves 56 are inclined longitudinally and circumferentially in the same manner as the corresponding grooves in the first form of the invention to provide clearance or relief along the outer sides and forward edges of the cutting elements 14.

Pins 62 are embedded in the cutter head 10 at the forward or leading ends of the dovetail grooves 56, and these pins are located in the same manner as the corresponding pins in the first form of the invention to position the cutting elements 14 circumferentially on the head and to position the cutting points 28 for simultaneous engagement with the work. The pins 62 conveniently may be positioned at one side of the slots 58 and they preferably extend only a slight distance into the grooves 56, as best shown in Fig. 7.

In order to hold the cutting elements 14 against the stop members or pins 62, back-up blocks 64 are mounted in the dovetail grooves 56 behind the cutting elements. In the form of the invention here shown, the back-up blocks are removably fastened to the head by Allen-head screws 66. Carried by the blocks 64 are back-up screws 68 which can be tightened against the trailing ends of the cutting elements 14 when the clamping screws 60 are loose to urge the cutting elements forwardly against the stop members 62.

In order to remove any particular cutting element 14 from the head 10 it is first necessary to remove the back-up block 64 behind such element. The cutting element may then be moved longitudinally from the dovetail groove 56 in which it is mounted and disengaged from the head. A replacement cutting element 14 may then be inserted into the dovetail groove 56 and the block 64 again fastened to the cutter head. Back-up screw 68 is tightened against the cutting element 14 to force the same longitudinally against the stop members 62 and the clamping screws 60 are tightened to hold the cutting element fixedly associated with the cutter head 10.

From the foregoing it will be readily apparent that, except for the differences specifically referred to above, this form of the invention functions in the same manner to achieve the same beneficial results as the form of the invention first described. The cutting elements 14 have three different positions on the cutter head 10; and, by changing the same end for end in the grooves 56, a total of six cutting corners is available for use before the cutting elements must be ground and sharpened. The cutting elements 14 may be removed for repositioning or replacement without removing the cutter head from the machine, and it is not necessary to check the cutters for trueness after all or any of the cutting element has been repositioned or replaced. The operation of repositioning or replacing the cutting elements can be accomplished easily and quickly.

It is to be understood that the forms of the invention herewith shown and described are to be taken as preferred examples of the same and that various changes in the size, shape, and arrangement of the parts may be resorted to without departing from the spirit of the invention or the scope of the appended claims.

Having thus described the invention, we claim:

1. A milling cutter comprising a rotatable cutter head; an annular series of individual cutting elements carried by the head, said cutting elements having leading and trailing ends, bottom surfaces and inner and outer tapered sides; separate mountings for fastening and locating the individual cutting elements on the cutter head, said mountings having stop members arranged to engage and to locate the leading ends of said cutting elements, inclined surfaces extending from said stop members for supporting the cutting elements in identical positions on said cutter head, and undercut side walls overlapping one of the tapered sides of the cutting elements; and clamps arranged to engage the tapered sides of said cutting elements adjacent to said one tapered sides, said clamps having undercut portions which overlap said adjacent tapered sides of the cutting elements and cooperate with said first-mentioned undercut sides to hold the cutting elements fixed on the cutter head.

2. A milling cutter comprising a rotatable cutter head; an annular series of cutting elements carried by the head, said cutting elements having leading and trailing ends, bottom surfaces and inner and outer tapered sides; and separate mountings for fastening and locating the individual cutting elements on the head, said mountings having stop members arranged to engage and locate the leading ends of the cutting elements, inclined surfaces extending from said stop members and co-operable with said stop members to support the cutting elements identically on said cutter head, undercut side walls overlapping one of the tapered sides of the cutting elements, means arranged to clampingly engage the other tapered sides of the cutting elements, said means having undercut portions which overlap said other tapered sides of the cutting elements and cooperate with said first-mentioned undercut side walls to hold the cutting elements fixed on the cutter head and adjustable back-up screws arranged to engage the trailing ends of the cutting elements and operative to urge the same forwardly on said inclined surfaces to press the leading ends thereof against said stop members.

3. A milling cutter comprising a rotatable cutter head; an annular series of individual cutting elements carried by the head, said cutting elements having leading and trailing ends, bottom surfaces and inner and outer tapered sides; and separate mountings for fastening and locating the individual cutting elements on said head, said mountings having stop members arranged to engage and locate the leading ends of said cutting elements, inclined surfaces extending from said stop members supporting the cutting elements identically on the cutter head, relatively movable, laterally spaced, undercut walls at opposite sides of the cutting elements overlapping the tapered sides of such elements and confining the cutter elements therebetween, said undercut walls forming guideways which permit the cutting elements to move longitudinally on said inclined surfaces relative to said stop members but prevent lateral movement of the cutting elements as well as movement of said cutting elements away from said inclined surfaces; adjustable means for tightening said inclined walls against the cutting elements so that the walls clamp the cutting elements and prevent movement thereof in any direction.

4. A milling cutter comprising a rotatable cutter head; an annular series of individual cutting elements carried by the cutter head, said cutting elements having leading and trailing ends, bottom surfaces and inner and outer tapered sides; and separate mountings for fastening and locating the individual cutting elements on said cutter head, said mountings have stop members arranged to engage and locate the leading ends of said cutting elements, inclined surfaces extending from said stop members and supporting the cutting elements identically on the cutter head, relatively movable, laterally spaced, undercut walls at opposite sides of the cutting elements, said walls overlapping the tapered sides of said cutting elements and forming guideways which permit the cutting elements to move longitudinally on said inclined surfaces relative to said stop members but prevent lateral movement of the cutting elements as well as movement of said cutting elements away from said inclined surfaces, adjustable means for tightening said inclined walls against the opposite sides of said cutting elements so that the walls clamp the cutting elements and prevent movement thereof in any direction, and adjustable back-up screws engageable with the trailing end of said cutting elements and operable to move the latter longitudinally on said inclined surfaces between said undercut walls to position the leading ends of said cutting elements against said stop members.

5. A milling cutter comprising a rotatable cutter head; an annular series of cutting elements carried by said cutter head and adjustable generally at right angles to radii of said head, said cutting elements having leading and trailing ends and inner and outer tapered sides; clamping blocks fastening said cutting elements on said cutter head; and stops carried by said cutter head engaged by the leading ends of said cutting elements for locating said cutting elements circumferentially on the head, said cutter head having inclined surfaces adjacent said stop members and under said cutting elements, said surfaces positioning all of said cutting elements identically on said cutter head and with the leading ends of the cutting elements slightly above the trailing ends thereof, said cutter head and said clamping block having undercut portions at opposite sides of the cutting elements which overlap the tapered sides of the latter and cooperate to hold the cutting elements fixed on the cutter head.

6. A milling cutter comprising a rotatable cutter head; a plurality of cutting elements each having three flat identically shaped sides, having the form of an equilateral triangle in transverse section, and being identical in size and shape throughout its length; said cutting elements being arranged in series on the front of said head adjacent the periphery thereof and each cutting element being disposed with one side flat against the face of the cutter head; said head having elongated formed surfaces extending generally along chords of the head supporting and flatly engaging the confronting sides of said cutting element; said formed surfaces sloping downwardly from the front face and away from the direction of rotation of the head and positioning the trailing ends of the cutting elements below the leading ends thereof so as to provide necessary face clearance for the elements; fixed stops projecting from the front face of the cutter head and engaging the leading ends of the cuttting elements to position the outermost portions thereof in precise coplanar relation; adjustable back-up screws engaging the trailing ends of the cutting elements and holding the latter against said stops; fixed abutments on the head engaging the cutting elements at one side thereof and locating said elements radially with respect to the head, said abutments being inclined slightly inwardly toward the trailing ends of the cutting elements to provide necessary peripheral relief therefor; and clamp means engaging the cutting elements at the other sides thereof holding the same solidly against the abutments and securely on the cutter head.

7. A milling cutter comprising a rotatable cutter head; and a plurality of cutting elements all of identical size and shape, each cutting element having the form of an equilateral triangle in transverse section and of uniform conformation for substantially the entire length thereof, all of said cutting elements disposed with one side thereof flatly against a radial face of the cutter head and arranged along chords of the head with the axes thereof substantially at right angles to the axis of the head, said head having two formed surfaces engaging and solidly supporting each cutter blade, each pair of said surfaces engaging adjacent sides of the blade supported thereby, one surface inclining downwardly from the face of the cutter head and away from the leading end of the blade, the other surface inclining slightly inwardly toward the center of the cutter head, means positioning all of the cutting elements identically on the supporting surfaces of the head and with the outermost portions thereof in precise coplanar relation, and means clamping said cutting elements against said supporting surfaces.

HOWELL E. BEGLE.
GEDEON F. GAUDREAU.

References Cited in the file of this patent

UNITED STATES PATENTS

| Number | Name | Date |
|---|---|---|
| 1,387,417 | Lennon | Aug. 9, 1921 |
| 1,635,732 | Witt | July 12, 1927 |
| 1,688,913 | Ahrendt | Oct. 23, 1928 |
| 1,970,016 | Morton | Aug. 14, 1934 |
| 1,978,084 | Howard | Oct. 23, 1934 |
| 2,327,944 | Toubhans | Aug. 25, 1943 |
| 2,333,653 | Kraus | Nov. 9, 1943 |

FOREIGN PATENTS

| Number | Country | Date |
|---|---|---|
| 126,334 | Germany | Jan. 6, 1902 |
| 127,387 | Germany | Aug. 23, 1902 |
| 318,815 | Germany | Feb. 12, 1920 |